(12) United States Patent
Candutti et al.

(10) Patent No.: US 11,007,461 B2
(45) Date of Patent: May 18, 2021

(54) DUST-HANDLING DEVICE FOR COLLECTING AND HANDLING DUST IN A PAPER-MAKING ENVIRONMENT

(71) Applicant: VALMET S.P.A., Milan (IT)

(72) Inventors: Massimiliano Candutti, Gorizia (IT); Klavdij Lasic, Sempeter pri Gorici (SI); Marco Russian, Mossa (IT)

(73) Assignee: VALMET S.P.A., Milan (IT)

( * ) Notice: Subject to any disclaimer, the term of this patent is extended or adjusted under 35 U.S.C. 154(b) by 152 days.

(21) Appl. No.: 16/317,207

(22) PCT Filed: Jun. 22, 2017

(86) PCT No.: PCT/EP2017/065398
§ 371 (c)(1),
(2) Date: Jan. 11, 2019

(87) PCT Pub. No.: WO2018/010933
PCT Pub. Date: Jan. 18, 2018

(65) Prior Publication Data
US 2019/0224601 A1    Jul. 25, 2019

(30) Foreign Application Priority Data

Jul. 12, 2016  (EP) .................................. 16179010

(51) Int. Cl.
*B01D 50/00* (2006.01)
*B01D 45/12* (2006.01)
(Continued)

(52) U.S. Cl.
CPC .............. *B01D 45/12* (2013.01); *D21F 7/00* (2013.01); *D21G 9/00* (2013.01); *A47L 9/1666* (2013.01);
(Continued)

(58) Field of Classification Search
CPC .... B01D 45/12; B01D 47/06; B01D 46/0068; B01D 41/04; B01D 46/04; B01D 46/0065;
(Continued)

(56) References Cited

U.S. PATENT DOCUMENTS 3,432,384 A * 3/1969 Dahl ........................ D21F 1/02
162/338
5,512,133 A * 4/1996 Markham .............. D21B 1/325
162/4
(Continued)

FOREIGN PATENT DOCUMENTS

CN        205323426 U     6/2016
WO     WO 97/44525 A1   11/1997

OTHER PUBLICATIONS

International Searching Authority, International Search Report and Written Opinion for International Application No. PCT/EP2017/065398, dated Sep. 11, 2017, 10 pages, European Patent Office, Netherlands.

*Primary Examiner* — Dung H Bui
(74) *Attorney, Agent, or Firm* — Alston & Bird LLP (57) ABSTRACT

The invention relates to a dust-handling device (1) for collecting and handling dust in a paper-making environment wherein the dust-handling device (1) comprises a source of underpressure (2) and an elongated collector (3) that extends along a longitudinal axis. The elongated collector (3) is connected to the source of underpressure (2) such that underpressure can be generated inside the elongated collector (3) and the elongated collector (3) has an inlet (5) through which dust-laden air can enter the elongated collector (3) and an exit opening (6) through which dust-laden air can be evacuated from the elongated collector. The inlet (5) of the elongated collector (3) is disposed in such a relation to the longitudinal axis of the elongated collector (3)

(Continued)

so that upon drawing the dust-laden air into the elongated collector (3), an air vortex is induced with the dust-laden air wherein the induced air vortex flows between the collector inlet (5) and the collector exit opening (6). A source of water (7) is connected to the elongated collector such that water can be introduced into elongated collector (3) so that dust of the dust-laden air can be exposed to and mix with the water introduced into the elongated collector (3). According to the invention, a dust removal device (8, 10) is mounted on the elongated collector and arranged to act against the inlet (5) to remove dust that has clogged the inlet (5). The invention also relates to a method in which dust clogging the inlet (5) is removed.

13 Claims, 8 Drawing Sheets

(51) Int. Cl.
*D21F 7/00* (2006.01)
*D21G 9/00* (2006.01)
*B01D 47/06* (2006.01)
*D21F 5/06* (2006.01)
*B01D 46/00* (2006.01)
*B01D 41/04* (2006.01)
*B01D 46/04* (2006.01)
*A47L 9/20* (2006.01)
*A47L 9/16* (2006.01)
*D21G 3/00* (2006.01)

(52) U.S. Cl.
CPC .............. *A47L 9/20* (2013.01); *B01D 41/04* (2013.01); *B01D 46/0065* (2013.01); *B01D 46/0068* (2013.01); *B01D 46/04* (2013.01); *B01D 47/06* (2013.01); *D21F 5/06* (2013.01); *D21G 3/00* (2013.01); *Y10S 55/03* (2013.01)

(58) Field of Classification Search
CPC .... D21F 7/00; D21F 5/00; D21G 9/00; D21G 3/00; Y10S 55/03; A47L 9/20; A47L 9/1666
See application file for complete search history.

(56) References Cited

U.S. PATENT DOCUMENTS

| | | | | |
|---|---|---|---|---|
| 5,571,406 | A * | 11/1996 | Mensching | B01D 29/01 210/159 |
| 6,068,735 | A * | 5/2000 | Marchal | D21G 3/00 162/272 |
| 6,176,898 | B1 | 1/2001 | Courtney et al. | |
| 8,034,192 | B2 | 10/2011 | Ringer et al. | |
| 10,533,285 | B2 * | 1/2020 | Candutti | D21G 3/00 |
| 2004/0112845 | A1 * | 6/2004 | Mattox | B01D 29/6484 210/791 |
| 2007/0028778 | A1 * | 2/2007 | Meinander | D21D 5/24 96/209 |
| 2008/0295466 | A1 * | 12/2008 | Cha | A47L 9/1666 55/296 |
| 2009/0126764 | A1 * | 5/2009 | Ringer | D21G 3/00 134/21 |

\* cited by examiner

DUST-HANDLING DEVICE FOR COLLECTING AND HANDLING DUST IN A PAPER-MAKING ENVIRONMENT

CROSS REFERENCE TO RELATED APPLICATIONS

This application is a National Stage Application, filed under 35 U.S.C. § 371, of International Application No. PCT/EP2017/065398, filed Jun. 22, 2017, which application claims priority to European Application No. 16179010.0, filed Jul. 12, 2016; the contents of both of which as are hereby incorporated by reference in their entirety.

BACKGROUND

Related Field

The present invention relates to a dust-handling device for collecting and handling dust in a paper-making environment. The invention also relates to a method for collecting and handling dust in a papermaking environment.

Description of Related Art

In a room in which a papermaking machine is used for making tissue paper, a large amount of dust is generated. For example, dust may be generated when a tissue paper web is doctored off from a Yankee drying cylinder. The dust generated can result in worker health hazards and cleanliness problems. In addition, the dust may increase the risk of fire since dust-laden air can be flammable. Therefore, it is customary to seek to evacuate dust-laden air from the area of the paper-making machine. A known device for collecting and handling dust in a paper-making environment is disclosed in U.S. Pat. No. 6,176,898. That document discloses a device and a process in which an elongated collector with an inlet and an exit opening is used. A vacuum-generating source is connected to the collector and dust-laden air can be drawn into the collector such that air vortex is induced that flows between the inlet and the exit opening. Water is introduced into the collector such that it collides with the dust-laden air and encapsulates dust particles. The introduction of water can rinse the interior walls of the collector such that the interior of the collector remains in a relatively clean condition and the dust is wetted. The wetting of the dust also reduced the risk of fire. A dust collector in which water is introduced is also disclosed in U.S. Pat. No. 8,034,192.

The object of the present invention is to provide an improved design for dust-handling devices using the principle of introducing water. In particular, it is an object of the present invention to achieve a dust collector with improved reliability of operation.

DISCLOSURE OF THE INVENTION

The inventors of the present invention have recognized that operation of a wet dust collector of the general type disclosed in U.S. Pat. No. 6,176,898 in which water is introduced into the collector can be disturbed and that one source of disturbances may be that the inlet to the dust collector may become clogged or partially clogged by dust entering through the inlet of the collector. In U.S. Pat. No. 6,176,898, it is suggested that an inlet guard assembly comprised of a plurality o rods can be pivotally attached to facilitate cleaning. In practice, the inlet to a wet dust collector can be cleaned manually but due to the location of the inlet, it is frequently difficult to reach the inlet for cleaning. Therefore, the present invention seeks to facilitate cleaning of the inlet to the dust collector by an arrangement that is more efficient in keeping the inlet to the collector free of dust.

The present invention relates to a dust-handling device for collecting and handling dust in a paper-making environment. The dust-handling device comprises a source of underpressure and an elongated collector that extends along a longitudinal axis. The elongated collector is connected to the source of underpressure such that underpressure can be generated inside the elongated collector and the elongated collector has an inlet through which dust-laden air can enter the collector and an exit opening through which dust-laden air can be evacuated from the collector. The inlet of the collector is disposed in such a relation to the longitudinal axis of the collector so that upon drawing the dust-laden air into the collector, an air vortex is induced with the dust-laden air such that the induced air vortex flows between the collector inlet and the collector exit opening. A source of water is connected to the elongated collector such that water can be introduced into elongated collector so that dust of the dust-laden air can be exposed to and mix with the water introduced into the elongated collector. According to the invention, the dust handling device comprises a dust removal device mounted on the elongated collector that is arranged to act against the inlet to remove dust that has clogged the inlet.

Preferably, the inlet of the elongated collector extends in the direction of the longitudinal axis of the elongated collector.

In a preferred embodiment of the present invention, the dust removal device is a blade that is hingedly connected to the elongated collector in such a way that the blade can be rotated from a first position in which it does not block the inlet into a second position such that the rotation of the blade from the first position to the second position removes dust that has accumulated at the inlet of the elongated collector.

In an alternative embodiment, the dust removal device comprises at least one nozzle connected to a source of fluid which at least one nozzle is arranged to direct a stream of fluid against the inlet such that dust that has accumulated at the inlet can be blown or washed away from at least a part of the inlet.

The dust removal device may be connected to an activating device that is set to activate the dust removal device at predetermined time intervals. This may be the case both when the dust removal device is a blade and when the dust removal device comprises a nozzle connected to a source of fluid.

Preferably, the elongated collector has interior walls that are rounded in shape and the inlet of the collector opens into the interior of the collector so that dust-laden air which is drawn into the collector is moved by the source of underpressure substantially tangentially along an interior wall of the collector.

The invention also relates to a method for collecting and handling dust in a papermaking environment. The inventive method comprising the steps of providing an elongated collector having an inlet, an exit opening and a longitudinal axis and drawing dust-laden air into elongated collector through the inlet of the collector and inducing an air vortex which flows between the inlet and exit opening of the collector. The air vortex is centered about the longitudinal axis of the collector and is formed with the dust-laden air drawn into the collector. The method further comprises introducing water into the collector such that dust in the dust-laden air is exposed to and mixes with the water so introduced. According to the invention, the method further comprises removing dust clogging the inlet by means of a dust removal device mounted on the elongated collector.

In preferred embodiments, dust is removed from the inlet by means of a blade that is caused to rotate into the inlet such that dust that has accumulated at the inlet is pushed into the collector.

In an alternative embodiment of the method, dust is removed from the inlet by means of a stream of fluid.

In embodiments of the inventive method, dust is removed at predetermined intervals.

DETAILED DESCRIPTION OF VARIOUS EMBODIMENTS

Figure 1:
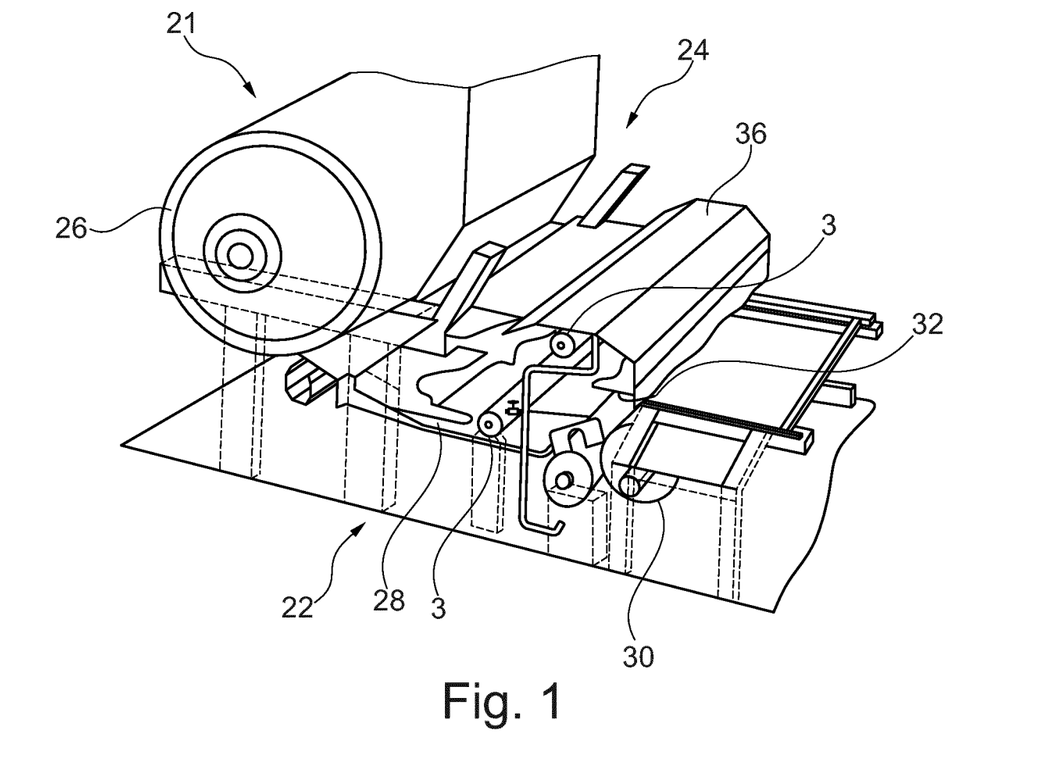
FIG. 1 is a perspective view of a part of a papermaking machine with which an embodiment of a dust handling system is employed.

Reference will first be made to FIG. 1 that shows a perspective view of a part of a papermaking machine with which an embodiment of a dust handling system is employed. The reference numeral 21 indicates the environment in which the present invention is to be used and the reference numeral 24 indicates a part of a paper making machine. In a practical case, the paper making machine includes a cylinder 26 which is normally a drying cylinder such as a Yankee drying cylinder from which a dried paper web 28 is sent further to be rolled up into a roll of paper 30. At this stage, a large amount of dust from the paper making process may be filling the environment of the paper making machine. This is in particular the case when the paper web 28 has been creped off from the cylinder 26 by a doctor blade. The dust in the air may contain fibers but also remnants of clay, starch and chemicals used in the paper making process. To decrease worker health hazard and the risk of fire, the paper making machine is provided with a dust handling system generally indicated by the reference numeral 22. A canopy hood 36 is used to create a confined space 32 from which dust can be evacuated by means of one or several dust-handling devices. The dust handling system 22 comprises one or several duct collectors 3 as will be explained in the following. The dust collector or dust collectors 3 are provided with inlets through which dust can be drawn in and subsequently evacuated.

Figure 2:
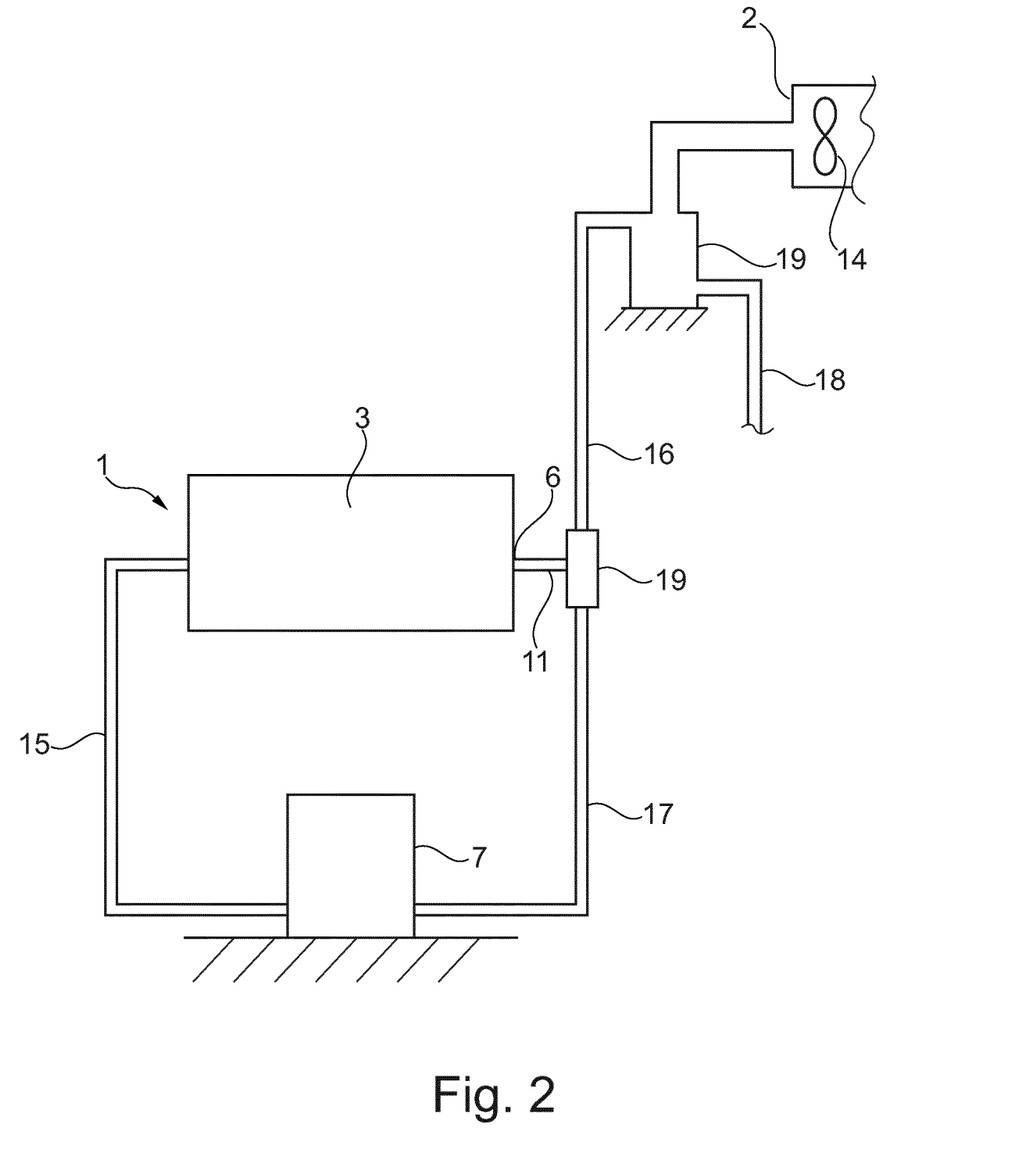
FIG. 2 is a cross-sectional view of some of schematically illustrating the operating components of the dust handling system of FIG. 1.

FIG. 2 shows the general outlines of the dust-handling device 1 in which the present invention is used. In FIG. 2, it can be seen how the dust-handling device 1 comprises an elongated collector 3 that may be connected to a source of underpressure 2 and a source of water 7. The source of underpressure 2 which may include a fan 14 is connected to an exit opening 6 of the elongated collector 3 through a duct/conduit 16 and the source of water 7 is connected to the elongated collector 3 through a duct or conduit 15. The exit opening 6 of the elongated collector may open directly into the duct 16 but may suitably be connected to the duct 16 through a conduit 11 as indicated in FIG. 2. In embodiments of the invention, a drain port/drain module/droplet separator may optionally be arranged through which much of the water leaving the exit opening 6 can be drained such that water can flow back to the source of water 7 through a duct/conduit 17. If a drain port is used, the drain port can be arranged, for example, as disclosed in U.S. Pat. No. 6,176,898 (see FIG. 2 of U.S. Pat. No. 6,176,898, see the drain port 90). In the embodiment of FIG. 2, the ducts 16 and 17 are both connected to the drain port/drain module (or droplet separator) 19 and the conduit 11 leading from the exit opening is also connected to the drain port/drain module/droplet separator 19. With further reference to FIG. 2, a drain port/drain module/droplet separator 19 may optionally be placed in the duct 16 that is connected to the source of underpressure 2 such that more water can be separated from the air. Water separated from air in a droplet separator 19 may optionally be sent back to the source of water 7 through a duct/conduit 18. In FIG. 2, it is not shown how the conduit 18 is connected to the source of water 7 but the skilled person will readily understand how this may be achieved.

During operation, the elongated collector 3 is subjected to underpressure through the duct 16 and water is supplied through the duct 15 and introduced into the elongated collector 3. When the water introduced through the duct 15 is introduced into the elongated collector 3 and dust-laden air is sucked into the elongated collector through the action of the source of underpressure 2, dust particles in the dust-laden air will mix with the water and dust particles will be encapsulated by water. Air and dust particles encapsulated by water will be evacuated from the elongated collector 3 through the duct 16 and water may optionally be brought back to the source of water 7 through the duct 17 leading back to the source of water 7. Although not shown in FIG. 2, the source of water 7 may be connected to a pump that is arranged to pump water from the source of water 7 to the elongated collector 3. It should be understood that FIG. 2 only gives a very schematic representation of how water may be supplied and how the collector 3 may be connected to a source of underpressure. For a more detailed explanation, reference is made to U.S. Pat. No. 6,176,898. The exact way in which water is supplied to the collector may be varied in many ways and it may be arranged, for example, as disclosed in U.S. Pat. No. 8,034,192.

It should be understood that the recirculation of water to the source of water 7 is optional. Embodiments are conceivable in which all water that has been used in the elongated collector 3 is simply discharged. If water is recirculated, a filter for dust particles may optionally be placed in the duct 17 and/or the duct/conduit 18.

Figure 3:
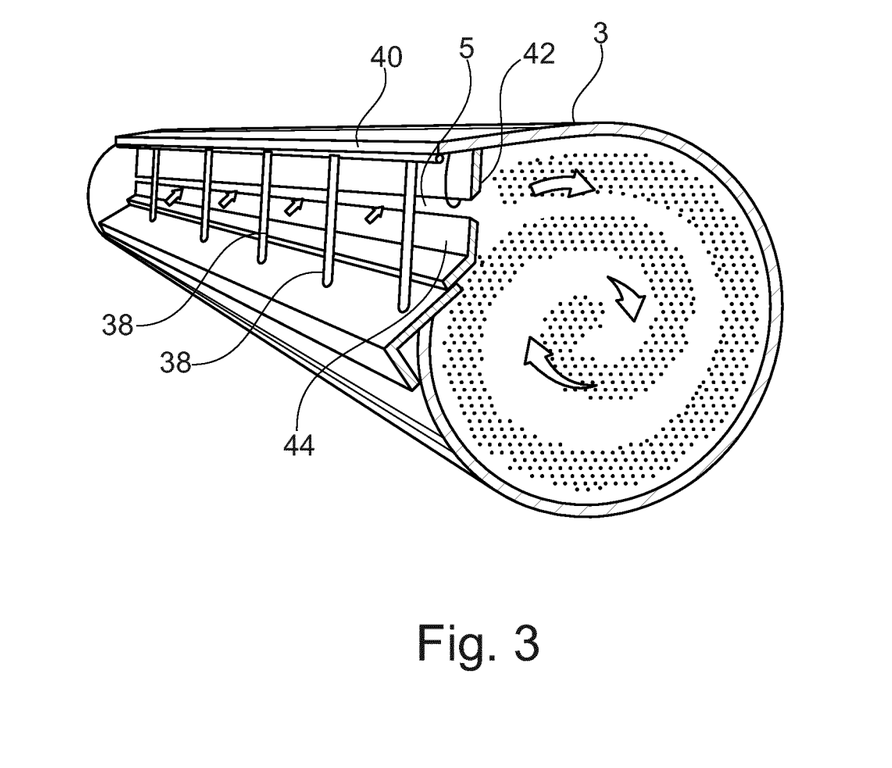
FIG. 3 is a perspective view, partially shown in section, of an embodiment of a dust collector for the dust handling system of FIG. 2.
Figure 4:
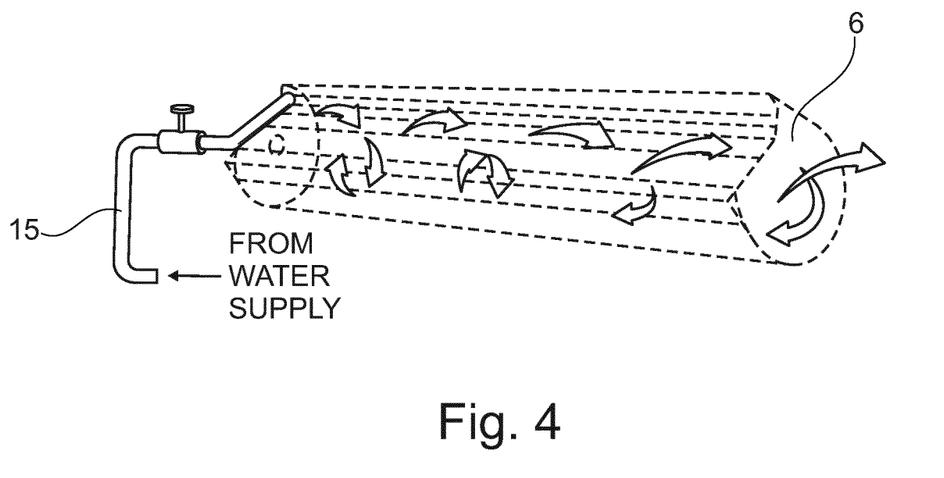
FIG. 4 is a perspective view illustrating the flow of dust and water in an embodiment of a dust collector for the dust handling system of FIG. 2.

With reference to FIG. 3 and FIG. 4, a more detailed description of the operation of the elongated collector 3 will now be given. It should be understood that the exact shape of the elongated dust collector 3 that is shown in FIGS. 3 and 4 is only an example of one possible shape that may be employed in some embodiments of the invention.

As can be seen in FIG. 3, the elongated collector 3 has a round shape and a generally tubular form. The elongated collector 3 has an inlet 5 formed between two wall parts 42, 44. In the embodiment of FIG. 3, the inlet 5 can be understood as the gap between wall parts 42, 44 that are part of the elongated collector 3. The wall part 42 may be connected to an overhang portion 40. Since the elongated collector 3 is connected to a source of underpressure, dust-laden air can be drain into the elongated collector 3 through the inlet 5. The inlet 5 of the elongated collector 3 is disposed parallel to or essentially in parallel to the longitudinal axis of the elongated collector 3 and upon drawing the dust-laden air into the elongated collector 3, an air vortex is induced with the dust-laden air. With further reference to FIG. 4, it can be seen how water is introduced into the elongated collector 3 and the water mixes with the dust-laden air and captures and encapsulates dust particles. The water also scrubs the interior walls of the elongated collector 3. The air and water which is now filled with dust particles are then evacuated through the exit opening 6. The induced air vortex will thus flow between the collector inlet 5 and the collector exit opening 6, i.e. from the inlet 5 to the exit opening of the elongated collector 3. As can be seen in FIG. 3, the elongated collector 3 may optionally be fitted with an inlet guard formed by bars 38.

Preferably, the inlet 5 of the elongated collector 3 extends in the direction of the longitudinal axis of the elongated collector 3.

In preferred embodiments, the collector 3 has interior walls 4 that are rounded in shape and the inlet 5 of the elongated collector 3 opens into the interior of the collector 3 so that dust-laden air which is drawn into the elongated collector 3 is caused to move by the underpressure which is generated by the source of underpressure 2 substantially tangentially along an interior wall 4 of the collector 3.

Figure 6:
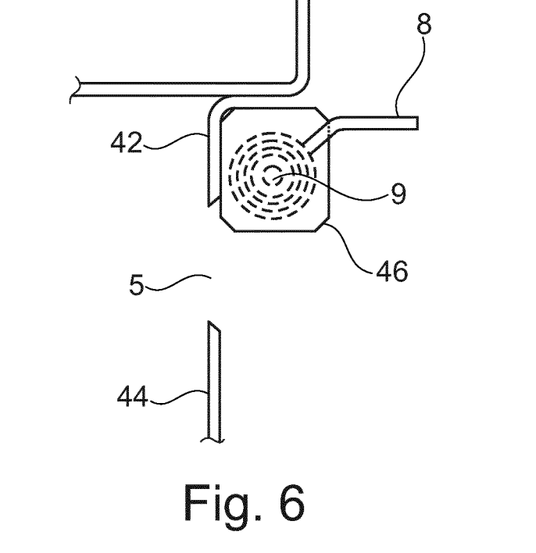
FIG. 6 is an enlargement of a part of the dust-handling device of FIG. 5.
Figure 7:
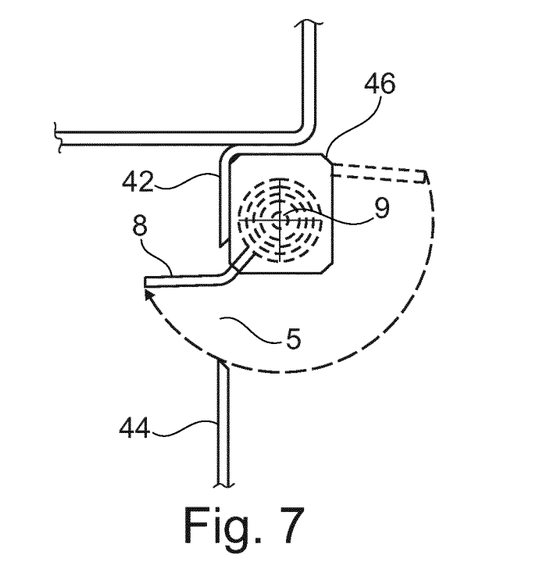
FIG. 7 is a view similar to FIG. 6 but in a different operating position.

An advantageous embodiment of the present invention will now be explained with reference to FIG. 5, FIG. 6 and FIG. 7.

Figure 5:
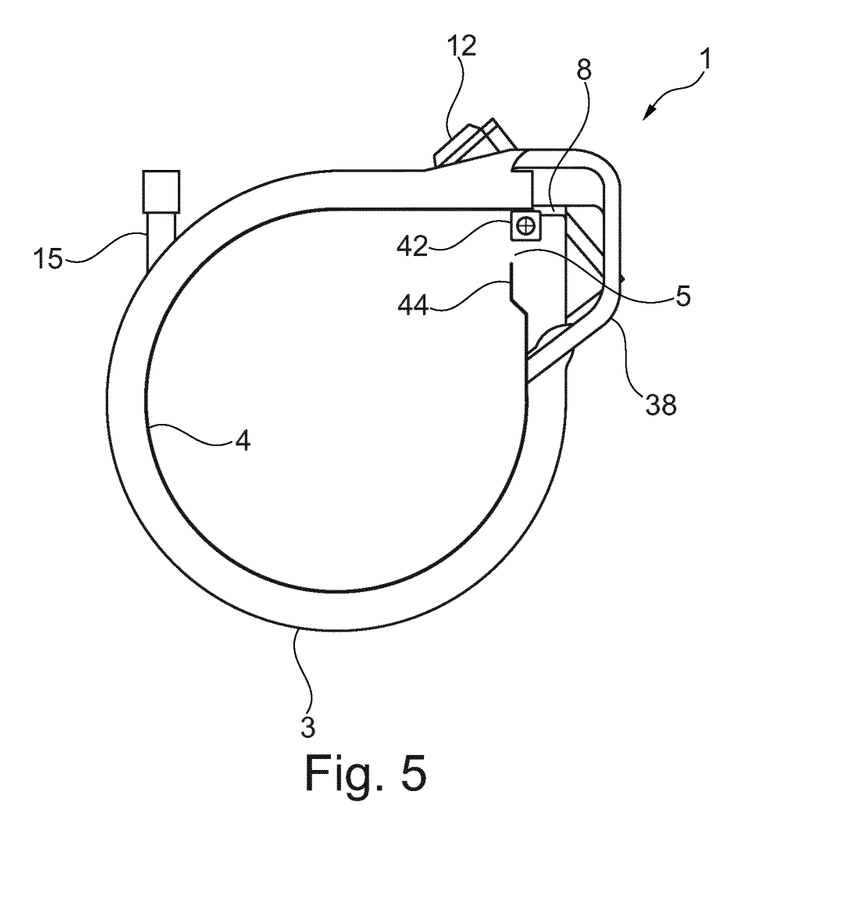
FIG. 5 is a cross-sectional view of an embodiment of a dust-handling device according to the present invention.

FIG. 5 shows an embodiment in which the water to the elongated collector 3 is supplied through a duct 15 that introduces the water tangentially into the elongated collector 3. The inner walls 4 are of a round shape. The inlet 5 can be seen as the slot between the wall elements 42 and 44. As will be explained in greater detail, a dust removal device is mounted on the elongated collector 3 to act against the inlet 5 to remove dust that has clogged the inlet 5.

In FIG. 5, a blade 8 is shown above the inlet 5 and an activating device 12 is arranged to act on the blade 8 in a way that will now be explained with reference to FIG. 6 and FIG. 7. As can be seen in FIG. 6, the blade 8 is mounted on a rod 9 which may be journalled in a housing 46. The rod or bar 9 can be caused to turn about its own axis by the activating device 12 that may be, for example, a pneumatic or hydraulic cylinder. The connection between the activating device 12 and the rod or bar 9 for causing the rod 9 to turn can be achieved in many ways that are well known to one of ordinary engineering skills and need not be explained in detail. The blade 8 can thus be said to be hingedly connected to the elongated collector 3 in such a way that it can be rotated when the rod 9 is rotated about its axis. In FIG. 6, the blade 8 is held above the inlet 5 and does not block the inlet 5. Dust-laden air is thus free to enter the elongated collector 3.

If the dust-handling device has been in operation for some time, there is a risk that the inlet 5 becomes clogged. If this happens, the blade 8 is activated by the activating device 12 such that the blade 8 is rotated from a first position shown in FIG. 6 to a second position shown in FIG. 7. In the first position, the blade 8 does not block the inlet 5 but when the blade 8 is rotated to the second position shown in FIG. 7, the rotation of the blade 8 will remove dust that has accumulated at the inlet 5 of the elongated collector 3.

The activating device 12 can be arranged to go into action when an operator pushes a button that is functionally connected to the activating device such that pushing the button causes that activating device 12 to turn the rod 9 such that the blade 8 performs a movement into the inlet 5 whereafter the activating device rotates the blade 8 back to its first position.

Figure 8:
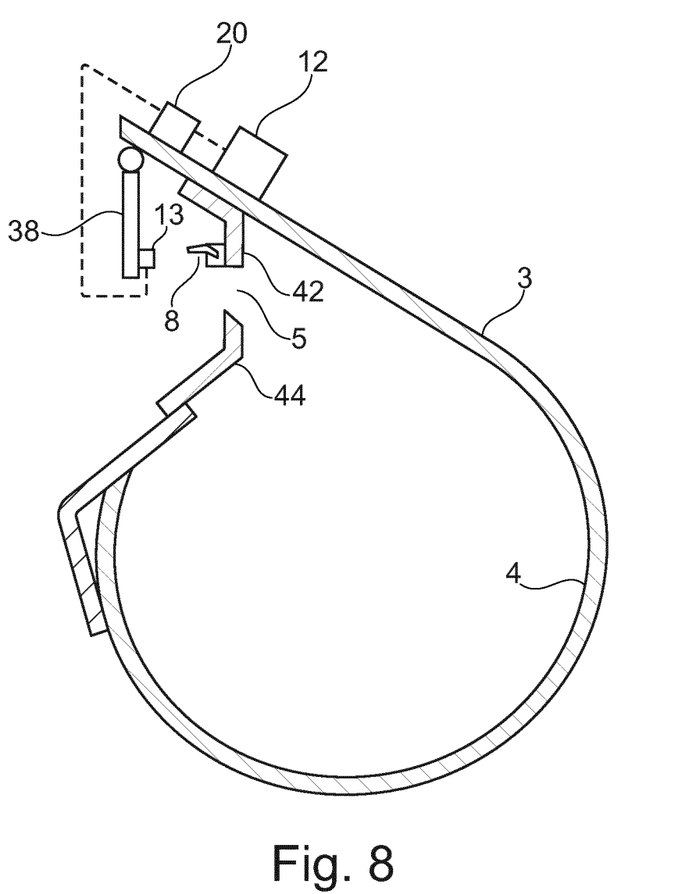
FIG. 8 is a cross-sectional schematic representation of a possible control system for an embodiment of the invention.

In an alternative embodiment shown in FIG. 8, the activating device 12 can be connected to a logic control unit 20 that is set to initiate action of the activating device 12 at predetermined time intervals. In such embodiments, the activating device 12 can thus be said to be set to activate the dust removal blade 8 at predetermined time intervals. While the logic control unit 20 is shown in FIG. 8 as being separate from the activating device 12, those units can be built together to form one single unit.

Instead of the activating unit 12 being set to activate the blade 8 at predetermined intervals of time, the activating device 12 can operate as follows. With reference to FIG. 8, a sensor 13 may be placed in front of the inlet 5. In FIG. 8, the sensor 13 is placed on a bar 38 forming part of the inlet guard but it should be understood that the sensor 13 could also be located in a different position. The sensor 13 is set to generate a signal when the inlet 5 is wholly or partially clogged by dust. The signal from the sensor 13 goes to the logic control unit 20 that causes the activating unit to turn the blade 8 from its first position to its second position (and back again) such that dust clogging the inlet 5 is removed by the blade 8 and pushed into the elongated collector 3 from which it can then be evacuated.

Figure 9:
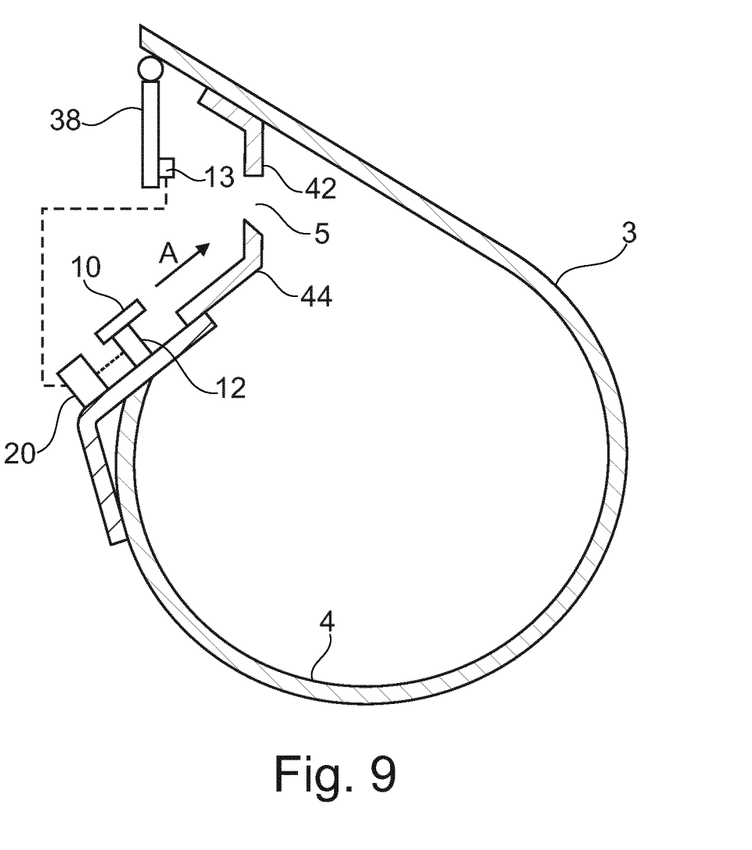
FIG. 9 is a view similar to that of FIG. 8 but illustrating an alternative embodiment of the invention.

An alternative embodiment of a dust removal device will now be explained with reference to FIG. 9. In the embodiment of FIG. 9, a nozzle 10 which is connected to a source of fluid such as water is placed on the elongated collector 3 and arranged to point against the inlet 5. The nozzle 10 is arranged to direct a stream of liquid (as indicated by the arrow A) against the inlet 5 such that dust that has accumulated at the inlet 5 can be blown or washed away from at least a part of the inlet 5. It should be understood that several such nozzles 10 may be used. Just like the blade 8, the nozzle can be activated by the push of a button or it could be controlled by a logic unit 20 that activates the nozzle or nozzles 5 at predetermined intervals or in response to a signal from a sensor 13 that indicates that a predetermined condition has been satisfied. This normally means that the sensor detects that clogging has reached a certain level when removal of dust from the inlet 5 is deemed necessary.

In both embodiments, there is thus a dust removal device 8, 10 which is mounted on the elongated collector. As can be seen from the foregoing description, the dust removal device of both embodiments is capable of actively removing dust that has clogged the inlet, i.e. it is capable to act to remove dust. Since the dust removal device is mounted on the elongated collector and arranged to act against the inlet while mounted on the elongated collector, there is no need to remove any components from the elongated collector in order to remove dust that has clogged the inlet. The dust removal device 8, 10 can thus remove dust from the inlet also when the paper making machine is running and the elongated collector is being operated and draws dust-laden air into the collector.

It should be understood that the present invention can be described both in terms of a dust handling device and in terms of a method of removing dust from a dust-handling device. In this context, it should be understood that the terms "device" and "method" only reflect different aspects of one and the same invention. The method may thus include such steps that would be the inevitable consequence of using the inventive equipment, regardless of whether such steps have been explicitly mentioned or not.

Thanks to the invention, operation of a wet dust collector can be made more reliable and the paper making machine in which the invention is used can operate with less disturbances.

The invention claimed is:

1. A dust-handling device (1) for collecting and handling dust in a paper-making environment, the dust-handling device (1) comprising:
    a source of under-pressure (2);
    an elongated collector (3) that extends along a longitudinal axis and which elongated collector (3) is connected to the source of under-pressure (2) such that under-pressure can be generated inside the elongated collector (3), the elongated collector (3) having an inlet (5) through which dust-laden air can enter the elongated collector (3) and an exit opening (6) through which dust-laden air can be evacuated from the elongated collector (3) and the inlet (5) of the elongated collector (3) being disposed in such a relation to the longitudinal axis of the elongated collector (3) so that upon drawing the dust-laden air into the elongated collector (3), an air vortex is induced with the dust-laden air wherein the induced air vortex flows between the inlet (5) and the exit opening (6) of the elongated collector (3); and
    a source of water (7) connected to the elongated collector such that water can be introduced into elongated collector (3) so that dust of the dust-laden air can be exposed to and mix with the water introduced into the elongated collector (3),
    wherein:
        the inlet (5) of the elongated collector (3) is a gap defined by opposing wall parts (42, 44);
        the inlet (5) extends in the direction of the longitudinal axis of the elongated collector (3);
        a dust removal blade (8) is hingedly connected to the elongated collector, the hinged connection permitting selective rotation of the blade (8) between a first position and a second position; and
        the second position of the blade (8) is such that a portion of the blade (8) passes through the gap of the inlet (5) defined by the opposing wall parts (42, 44).

2. The dust-handling device (1) according to claim 1, wherein:
    the first position of the dust removal blade (8) is such that no portion of the blade (8) passes through the inlet (5); and
    the second position is such that the rotation of the blade (8) from the first position to the second position removes dust that has accumulated across the inlet (5) of the elongated collector (3).

3. The dust-handling device according to claim 1 wherein the dust removal blade (8) is connected to an activating device (12) that is set to activate the dust removal blade (8) at predetermined time intervals.

4. The dust-handling device (1) according to claim 1, wherein the dust removal blade (8) is connected to an activating device (12) that is set to activate the dust removal blade (8) in response to a signal from a sensor (13) that indicates that a predetermined condition is satisfied.

5. The dust-handling device according to claim 1, wherein the elongated collector (3) has interior walls that (4) are rounded in shape and the inlet (5) of the elongated collector (3) opens into the interior of the elongated collector (3) so that dust-laden air which is drawn into the elongated collector (3) is caused to move by the under-pressure substantially tangentially along an interior wall (4) of the elongated collector (3).

6. A method for collecting and handling dust in a paper-making environment, the method comprising the steps of:
    providing an elongated collector (3) having an inlet (5), an exit opening (6) and a longitudinal axis, the inlet (5) of the elongated collector (3) being a gap defined by opposing wall parts (42, 44), the inlet (5) extending in the direction of the longitudinal axis of the elongated collector (3);
    drawing dust-laden air into the elongated collector (3) through the inlet (5) of the elongated collector (3) and inducing an air vortex which flows between the inlet (5) and exit opening (6) of the elongated collector (3), wherein the air vortex is centered about the longitudinal axis of the elongated collector (3) and is formed with the dust-laden air drawn into the elongated collector (3);
    introducing water into the elongated collector (3) such that the dust in the dust-laden air is exposed to and mixes with the water so introduced; and
    removing dust clogging the inlet (5) by means of a dust removal blade (8) device hingedly connected to the elongated collector, the hinged connection permitting selective rotation of the blade (8) between a first position and a second position, the second position being such that a portion of the blade (8) passes through the gap of the inlet (5) defined by the opposing wall parts (42, 44).

7. A method according to claim 6, wherein rotation of the blade (8) into the second position pushes the dust that has accumulated at the inlet (5) into the elongated collector (3).

8. A method according to claim 6, wherein the dust is further removed from the inlet (5) by means of a stream of fluid.

9. A method according to claim 6, wherein the dust is removed from the inlet (5) at predetermined intervals or in response from a sensor (13) that indicates that a predetermined condition is satisfied.

10. A dust-handling device (1) for collecting and handling dust in a paper-making environment, the dust-handling device (1) comprising:
    a source of under-pressure (2);
    an elongated collector (3) that extends along a longitudinal axis and which elongated collector (3) is connected to the source of under-pressure (2) such that under-pressure can be generated inside the elongated collector (3), the elongated collector (3) having an inlet (5) through which dust-laden air can enter the elongated collector (3) and an exit opening (6) through which dust-laden air can be evacuated from the elongated collector (3) and the inlet (5) of the elongated collector (3) being disposed in such a relation to the longitudinal axis of the elongated collector (3) so that upon drawing the dust-laden air into the elongated collector (3), an air vortex is induced with the dust-laden air wherein the induced air vortex flows between the collector inlet (5) and the collector exit opening (6); and a source of water (7) connected to the elongated collector such that water can be introduced into elongated collector (3) so that dust of the dust-laden air can be exposed to and mix with the water introduced into the elongated collector (3), wherein:

at least one nozzle 10) is mounted on the elongated collector and arranged to act against the inlet (5) to remove dust that has clogged the inlet (5); and the nozzle (10) is connected to a source of fluid which at least one nozzle (10) is arranged to direct a stream of fluid against the inlet (5) such that dust that has accumulated at the inlet (5) can be blown or washed away from at least a part of the inlet (5).

11. The dust-handling device according to claim 10, wherein the nozzle (10) is connected to an activating device (12) that is set to activate the nozzle (10) at predetermined time intervals.

12. The dust-handling device (1) according to claim 10, wherein the nozzle (10) is connected to an activating device (12) that is set to activate the nozzle (10) in response to a signal from a sensor (13) that indicates that a predetermined condition is satisfied.

13. The dust-handling device according to claim 10, wherein the elongated collector (3) has interior walls that (4) are rounded in shape and the inlet (5) of the elongated collector (3) opens into the interior of the elongated collector (3) so that dust-laden air which is drawn into the elongated collector (3) is caused to move by the under-pressure substantially tangentially along an interior wall (4) of the elongated collector (3).

* * * * *